(12) United States Patent
Okahisa et al.

(10) Patent No.: US 8,606,394 B2
(45) Date of Patent: Dec. 10, 2013

(54) ROBOT AND CONVEYING SYSTEM

(75) Inventors: Manabu Okahisa, Fukuoka (JP);
Kazunori Yamamoto, Fukuoka (JP)

(73) Assignee: Kabushiki Kaisha Yaskawa Denki, Kitakyushu-shi (JP)

(*) Notice: Subject to any disclaimer, the term of this patent is extended or adjusted under 35 U.S.C. 154(b) by 492 days.

(21) Appl. No.: 12/782,677

(22) Filed: May 18, 2010

(65) Prior Publication Data
US 2010/0298974 A1    Nov. 25, 2010

(30) Foreign Application Priority Data

May 19, 2009  (JP) .............................. P. 2009-121279

(51) Int. Cl.
*G06F 7/00*    (2006.01)
(52) U.S. Cl.
USPC ............... 700/230; 414/744.8; 414/744.1; 414/744.5; 414/282; 700/121; 700/245
(58) Field of Classification Search
USPC ............................................... 700/230
See application file for complete search history.

(56) References Cited

U.S. PATENT DOCUMENTS

| | | | | |
|---|---|---|---|---|
| 4,674,948 A * | 6/1987 | Hornacek | .................. | 414/744.8 |
| 5,249,904 A * | 10/1993 | Wakita et al. | .................. | 414/282 |
| 6,593,718 B1 * | 7/2003 | Yamazoe | ................. | 318/568.11 |
| 2001/0052708 A1 * | 12/2001 | Schmalz et al. | ................. | 294/65 |
| 2003/0078695 A1 * | 4/2003 | Takagi et al. | .................. | 700/245 |
| 2004/0001750 A1 * | 1/2004 | Kremerman | ............... | 414/744.1 |
| 2007/0020080 A1 * | 1/2007 | Wirth | ......................... | 414/744.5 |
| 2008/0249651 A1 * | 10/2008 | Hosek et al. | .................. | 700/121 |
| 2009/0138119 A1 * | 5/2009 | Co et al. | ........................ | 700/121 |
| 2010/0209225 A1 * | 8/2010 | Matsuo et al. | ............. | 414/744.5 |

FOREIGN PATENT DOCUMENTS

JP    11-208818    8/1999

* cited by examiner

*Primary Examiner* — Gene Crawford
*Assistant Examiner* — Kyle Logan
(74) *Attorney, Agent, or Firm* — Ditthavong Mori & Steiner, P.C.

(57) ABSTRACT

A robot includes an arm member, a rotary actuator that swings the arm member, a hand member provided at an end of the arm member, a joint member that connects the arm member and the hand member to each other such that the arm member and the hand member are rotatable with respect to each other, a linear actuator that supports and linearly moves the rotary actuator, and a controller that operates the rotary actuator and the linear actuator in association with each other to linearly move the hand member in a forward-backward direction.

26 Claims, 8 Drawing Sheets

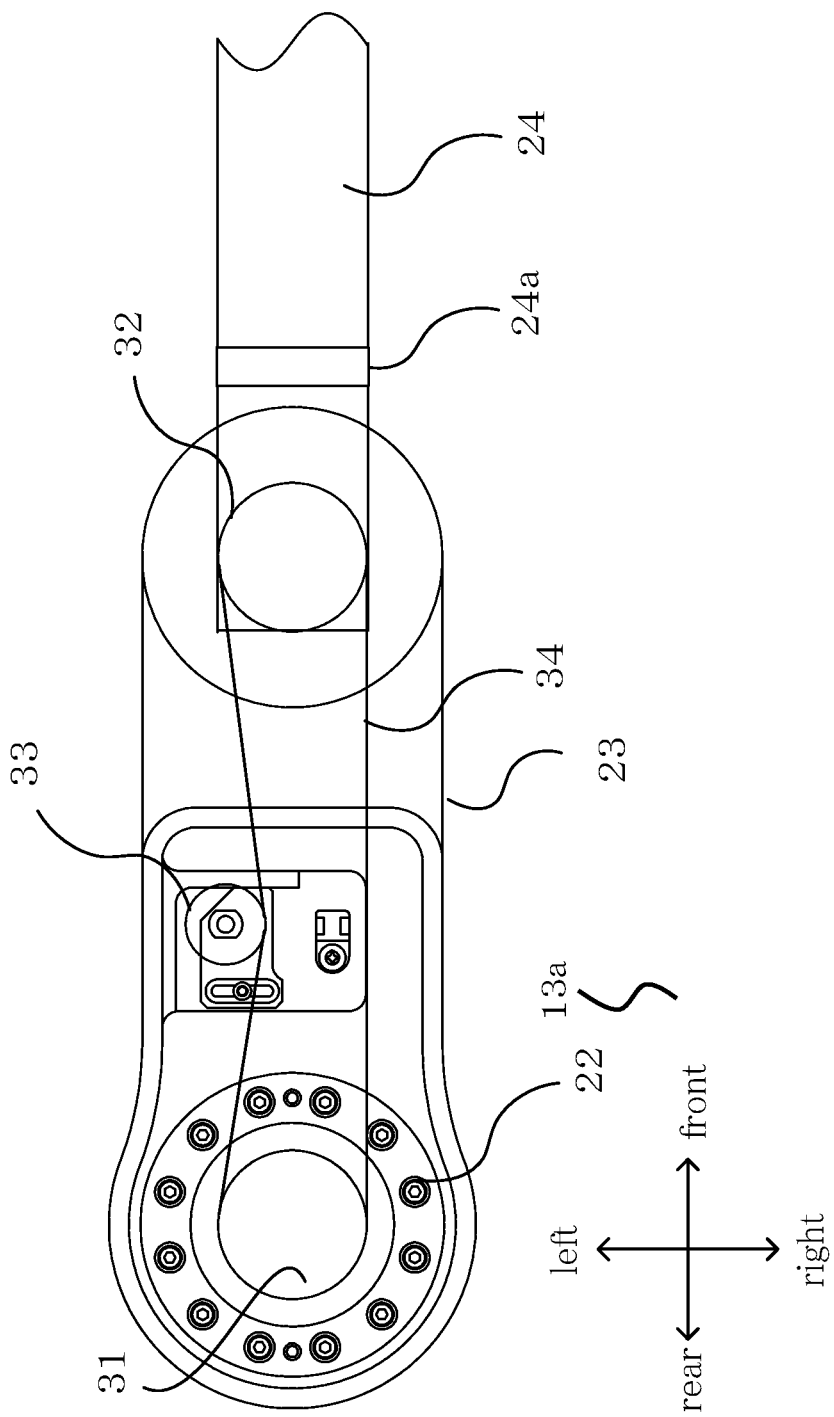

ated robot is provided with a double fork at an end of an arm thereof, and inserts the double fork into a lower section of an object placed in one of the racks to take out or convey the object (e.g., see Japanese Patent Laid-Open Publication No. 1999-208818). The contents of this patent publication are incorporated herein by reference in their entirety.

SUMMARY OF THE INVENTION

According to one aspect of the present invention, a robot includes arm members, rotary actuators that swing the arm members, hand members (forks) that are rotatably connected to end portions of the arm members, and a linear actuator that supports a pair of arms and linearly drives the pair of arms. The rotary actuators and the linear actuator are operated in association with each other in response to a command from a controller to linearly move each hand member in a forward-backward direction.

BRIEF DESCRIPTION OF THE DRAWINGS

The present invention will be described in further detail with reference to the accompanying drawings wherein:

FIG. 4 is a schematic top view illustrating a part of the robot in a see-through manner;

DESCRIPTION OF THE PREFERRED EMBODIMENTS

First Embodiment

Overall Structure

A first embodiment of the present invention will now be described with reference to the drawings.

Figure 2:
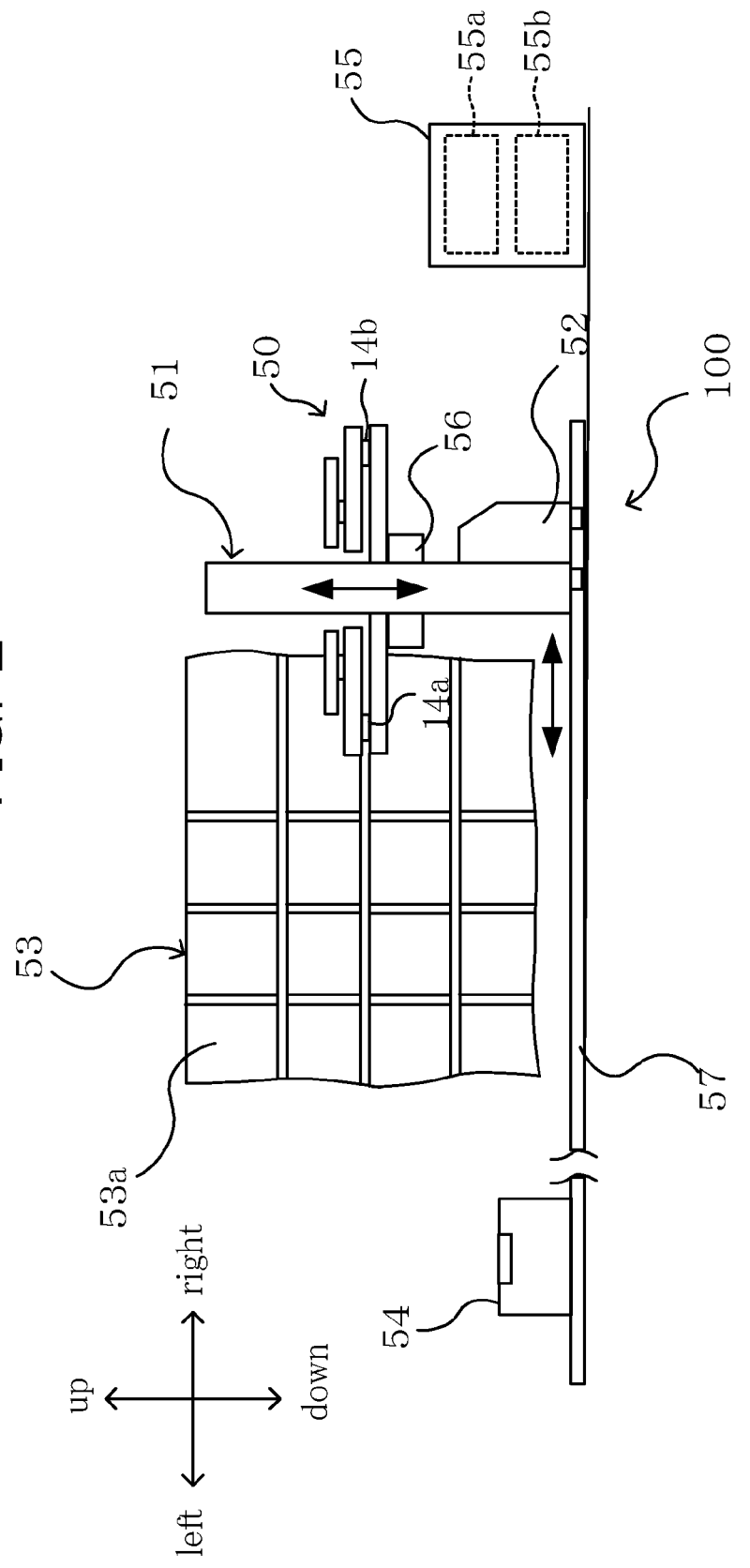
FIG. 2 is a schematic diagram illustrating the overall structure of a conveying system.

As illustrated in FIG. 2, an object conveying system 100 according to the first embodiment of the present invention includes a workpiece take-out robot (robot) 50, a raising-and-lowering device 51, a horizontal moving device 52, a storage cabinet 53, a delivery opening 54, and a controller 55.

The raising-and-lowering device 51 includes a raising-and-lowering mechanism for moving a support member 56 in a vertical direction (along the direction of gravity). A base end of the raising-and-lowering device 51 is fixed to a support section of the horizontal moving device 52.

The horizontal moving device 52 includes an actuator capable of linearly moving the support section along a rail 57 placed on the floor. The rail 57 extends in a left-right direction of the storage cabinet 53 in a top view (direction in which storage boxes 53a are arranged, that is, the longitudinal direction of the storage cabinet 53).

The storage boxes (object storage boxes) 53a store workpieces (objects) W and are arranged along the vertical direction and the left-right direction (direction along the rail 57) in the storage cabinet 53.

A plurality of types of storage boxes 53a having different lengths in the left-right direction are provided in accordance with the shapes of the workpieces W to be stored therein.

A conveyor belt or the like (not shown) is provided at the delivery opening 54. The conveyor belt carries the workpiece W that has been conveyed to the delivery opening 54 to the outside of the object conveying system 100.

The controller 55 includes a computer including a calculating device, a storage device, an input device, and a display device (not shown), and functions as an object-information acquisition unit (object-information acquiring means) 55a and a motion control unit 55b.

The controller 55 is connected to the robot 50, the raising-and-lowering device 51, and the horizontal moving device 52 such that information can be transmitted therebetween. The motion control unit 55b controls the operations of actuators included in the robot 50, the raising-and-lowering device 51, and the horizontal moving device 52 on the basis of the information input in advance from an input device.

The object-information acquisition unit 55a stores dimension information and position information (shape information in combination) of each storage box 53a (or each workpiece W) in the storage cabinet 53. The motion control unit 55b sets a gap (distance) between a pair of arms 1 and 2, which will be described below, in accordance with the shape information stored in the object-information acquisition unit 55a.

Structure of Robot

The structure of the robot 50 will now be described.

Figure 1:
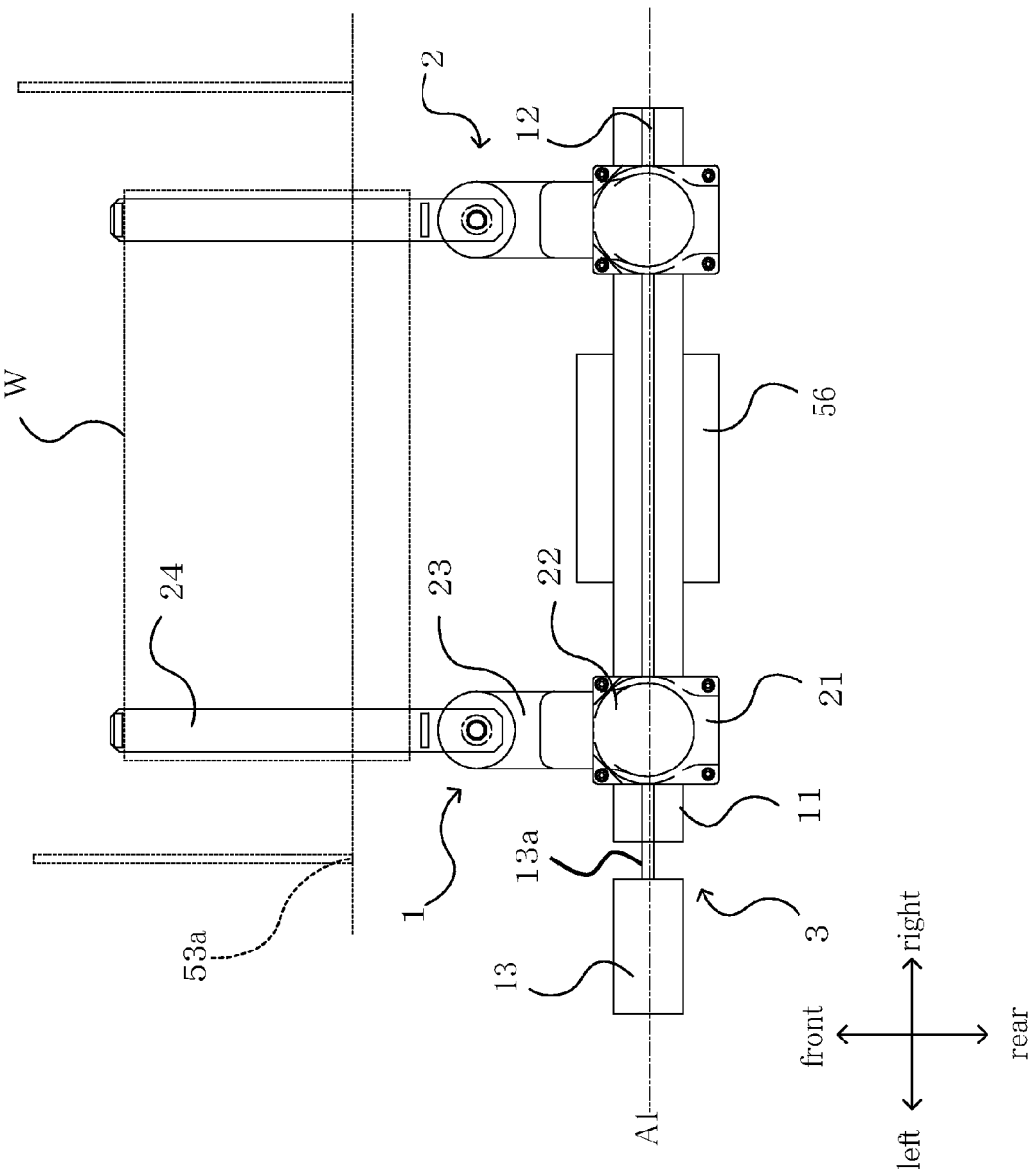
FIG. 1 is a schematic top view illustrating a robot according to a first embodiment.

As illustrated in FIG. 1, the robot 50 includes the arms 1 and 2 (a pair of arms) and a linear actuator 3.

The linear actuator 3 includes a base member 11, a ball screw 12, a servo motor (hereinafter referred to as a motor) 13 having reduction gears, and a pair of sliders 14a and 14b.

The base member 11 is connected to the support member 56 of the raising-and-lowering device 51, and extends in the left-right direction.

The ball screw 12 is a rod-shaped member having helical grooves formed therein, and is connected to an output shaft 13a of the motor 13 such that the ball screw 12 can rotate together with the output shaft 13a. The helical grooves in the ball screw 12 are formed such that the direction of the helical grooves is reversed at the central position of the ball screw 12 in the left-right direction.

The sliders (nuts) 14a and 14b (see FIG. 2) are attached to the ball screw 12 at positions symmetric to each other about the central position of the ball screw 12 in the left-right direction (ball screw 12 extends perpendicular to the forward-backward direction). That is, the "perpendicular" state does not completely exclude an error which is unavoidably produced in an industrial product, or an adjustment in design. The sliders (nuts) 14a and 14b have hollow holes formed therein, and helical grooves are formed in the inner surfaces of the hollow holes. The sliders (nuts) 14a and 14b linearly move in the opposite directions along the longitudinal direction of the ball screw 12 (along a linear driving axis A1) in response to the rotation of the ball screw 12.

Each of the arms 1 and 2 include a base 21, a rotary actuator 22, an arm body 23, and a fork (hand member) 24. The arms 1 and 2 have a similar structure. Therefore, only the arm 1 will be described in detail.

Figure 3:
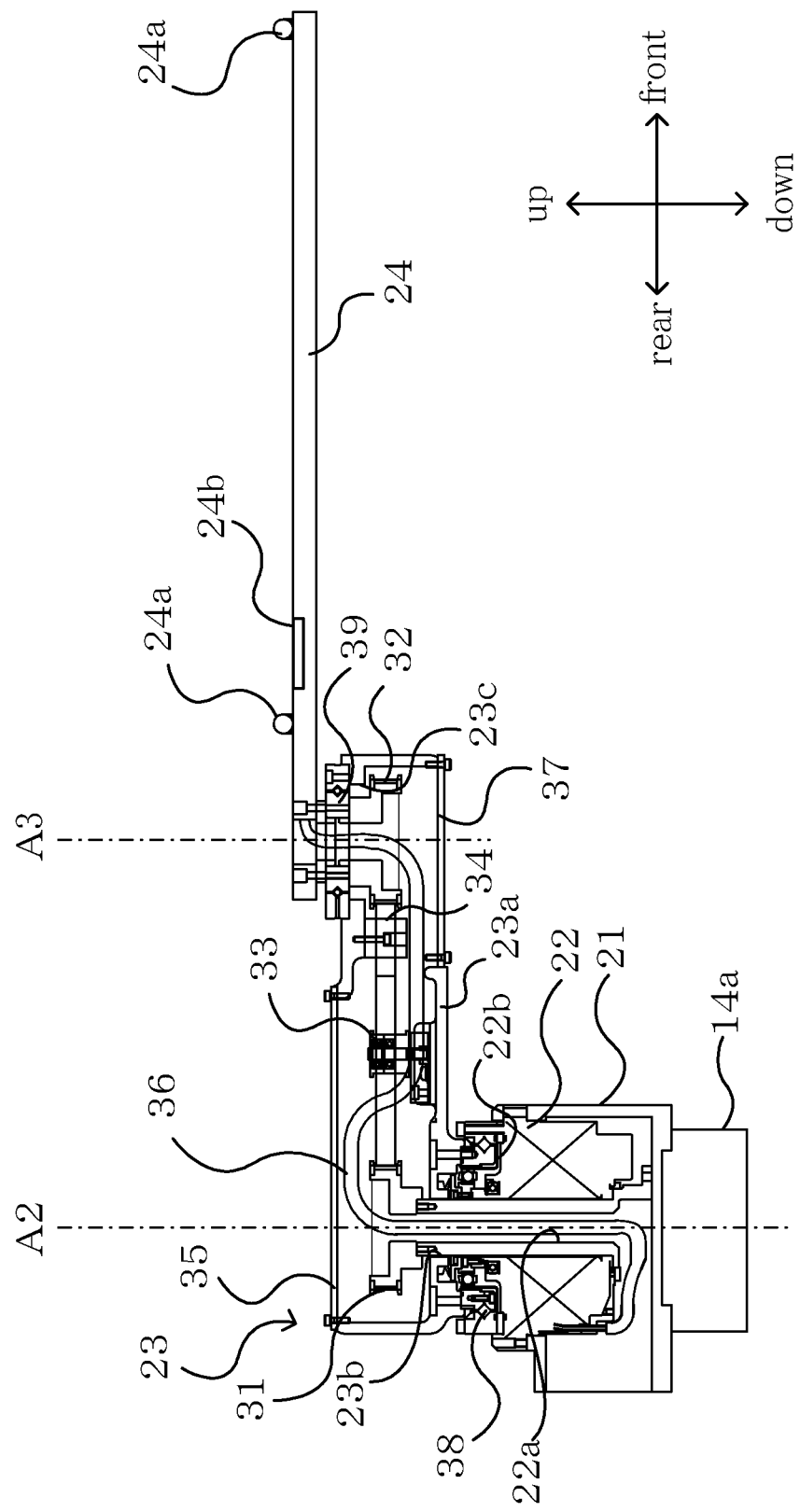
FIG. 3 is a schematic side view illustrating a part of the robot in a see-through manner.

As illustrated in FIGS. 3 and 4, the base 21 of the arm 1 is fixed to the slider 14a (the base 21 of the arm 2 is fixed to the slider 14b), and is moved in the left-right direction by the operation of the slider 14a.

The rotary actuator 22 includes a servo motor having reduction gears and a hollow shaft 22a, and is disposed in an inner space of the base 21.

The rotary actuator 22 also includes a rotary driving body (output shaft) 22b that rotates about a rotational axis A2. The rotary driving body 22b is supported by the main body of the rotary actuator 22 with a thrust bearing 38 interposed therebetween. The hollow shaft 22a is fixed to the base 21 irrespective of the rotation of the rotary driving body 22b.

The arm body (arm member) 23, which forms an outer shell of the arm 1 and which is also a structural member, is fixed with bolts to the rotary driving body 22b at a proximal end (end adjacent to the base 21) thereof. The arm body 23 is caused to swing about the rotational axis A2 by the operation of the rotary actuator 22.

The arm body 23 has a hole 23b at the proximal end thereof, and the hollow shaft 22a is disposed so as to extend through the hole 23b. A pulley (first pulley) 31 is fixed with bolts to the hollow shaft 22a.

When the rotary actuator 22 operates, the arm member 23 rotates together with the rotary driving body 22b. However, the hollow shaft 22a and the first pulley 31 do not rotate and are fixed to the base 21.

A cable 36 extends through the hollow shaft 22a. The cable 36 is connected to an object sensor 24b provided on the fork 24.

A hole 23c is formed in an upper section of the arm body 23 at a distal end (end adjacent to the fork 24) thereof. A pulley (second pulley) 32 is fitted to the hole 23c with a thrust bearing 39 interposed between the pulley 32 and the hole 23c.

The pulley 32 is bonded to a rotating portion of the thrust bearing 39 so that the pulley 32 rotates together with the rotating portion. In the present embodiment, the unit including the pulley 32 and the thrust bearing 39 corresponds to a joint member.

A belt 34 is stretched between the pulleys 31 and 32 to transmit the rotating forces of the pulleys 31 and 32.

A tension-applying mechanism 33 is provided on the arm body 23 at an intermediate portion between the pulleys 31 and 32. The tension-applying mechanism 33 adjusts the tension applied to the belt 34 to a suitable tension by pressing the belt 34 at one side thereof.

A maintenance cover 35 is disposed above the pulley 31, and a maintenance cover 37 is disposed below the pulley 32. Maintenance can be performed from the outside by removing fixing bolts with which the maintenance covers 35 and 37 are attached.

The fork 24 is fixed with bolts to the rotating portion of the thrust bearing 39 at a proximal end (end adjacent to the arm body 23) thereof, and is linked with the arm body 23 such that the fork 24 can swing with respect to the arm body 23 about a rotational axis A3. A stopper 24a for suppressing sliding of the workpiece W placed on the fork 24 is provided at each of the proximal end and a distal end of the fork 24.

The object sensor 24b detects whether or not there is a workpiece W placed on the fork 24. The detection result obtained by the object sensor 24b is input to the controller 55.

The object conveying system 100 according to the first embodiment of the present invention is structured as described above. The controller 55 moves the robot 50 to a position near the storage box 53a in which the workpiece W to be taken out is stored by operating the raising-and-lowering device 51 and the horizontal moving device 52 on the basis of information stored in the controller 55 in advance.

Figure 5A:
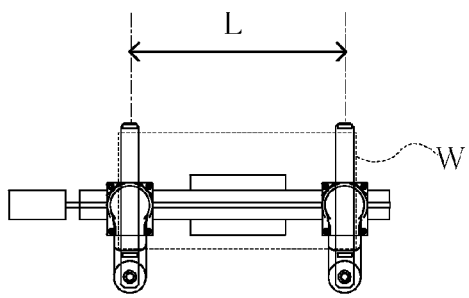
FIG. 5A is a diagram illustrating the operation of the conveying system.

Then, as illustrated in FIG. 5A, the controller 55 drives the linear actuator 3 included in the robot 50 to adjust a distance L between the arms 1 and 2 in accordance with the shape information of the storage box 53a. At this time, the arms 1 and 2 are positioned such that the distal ends of the arm bodies 23 are at the rearmost positions.

The controller 55 compares the actually set distance L with a distance L0 stored in advance.

Outward Rotation

As illustrated in FIG. 5A, in the case where the distance L is larger than the threshold L0 (L>L0), the controller 55 outwardly rotates the arms 1 and 2 to move the forks 24 in a forward-backward direction.

Figure 5B:
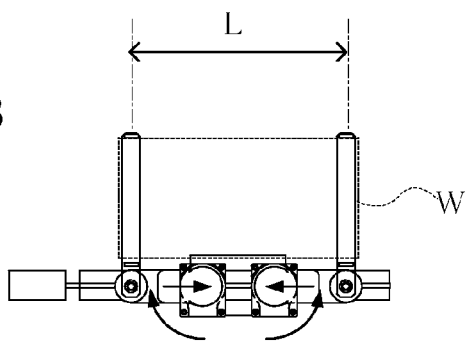
FIG. 5B is a diagram illustrating the operation of the conveying system.

More specifically, as illustrated in FIG. 5B, the rotary actuators 22 (rotary driving bodies 22b) included in the arms 1 and 2 are driven so as to swing the arm bodies 23 in directions such that the distal ends of the arm bodies 23 move away from each other (outward directions shown by the arrows in FIG. 5B). At the same time, the controller 55 drives the linear actuator 3 so as to move the bases 21 of the arms 1 and 2 toward each other.

The controller 55 adjusts the operation speeds of the rotary actuators 22 and the linear actuator 3 so that the forks 24 move along linear paths that extend in the forward-backward direction. The arms 1 and 2 move symmetrically to each other about a center plane of the linear actuator 3.

In each of the arms 1 and 2, when the rotary actuator 22 rotates, the arm body 23 rotates with respect to the first pulley 31, so that the belt 34 causes the second pulley 32 to rotate and the fork 24 rotates about the rotational axis A3 with respect to the arm body 23. Therefore, even when the rotary actuator 22 rotates, the longitudinal direction of the fork 24 constantly coincides with the forward-backward direction.

Figure 5C:
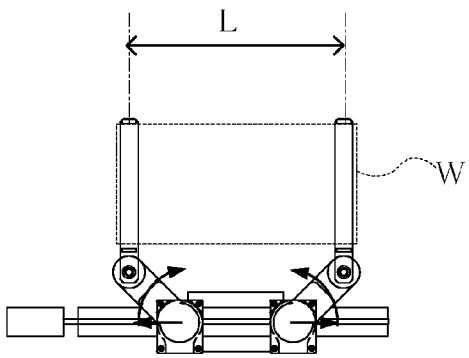
FIG. 5C is a diagram illustrating the operation of the conveying system.

In addition, at the same time, displacements of the forks 24 of the arms 1 and 2 in the left-right direction, which are caused by the swinging movements of the arm bodies 23, are compensated for by the operation of the linear actuator 3. Therefore, as shown in FIGS. 5B and 5C, the forks 24 linearly move in the forward-backward direction while the distance L therebetween is maintained constant.

Figure 5D:
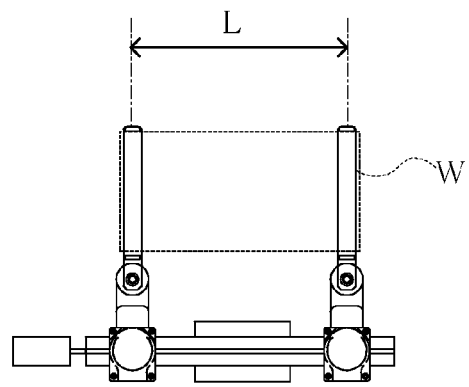
FIG. 5D is a diagram illustrating the operation of the conveying system.

Then, as illustrated in FIG. 5D, when the object sensors 24b provided on the forks 24 detect that the forks 24 have been inserted into a lower section of the workpiece W stored in the storage box 53a and that the workpiece W has been placed between the stoppers 24a, the controller 55 drives the rotary actuators 22 and the linear actuator 3 in directions opposite to those in the case where the forks 24 have been moved forward. As a result, the forks 24 are moved backward (in the retracting direction) to the positions shown in FIG. 5A.

Then, the raising-and-lowering device 51 and the horizontal moving device 52 are operated to move the robot 50 to a position near the delivery opening 54. Then, the forks 24 of the robot 50 are moved forward and backward in a similar manner to unload the workpiece W that has been taken out from the storage box 53a at the delivery opening 54.

Inward Rotation

Figure 6A:
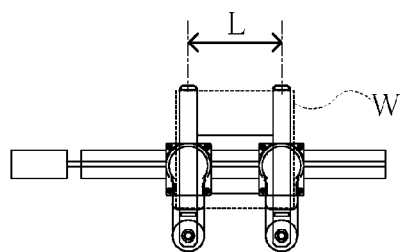
FIG. 6A is a diagram illustrating the operation of the conveying system.

As illustrated in FIG. 6A, in the case where the distance L is smaller than or equal to the threshold L0 ($L \leq L0$), the controller 55 inwardly rotates the arms 1 and 2 to move the forks 24 in the forward-backward direction.

Figure 6B:
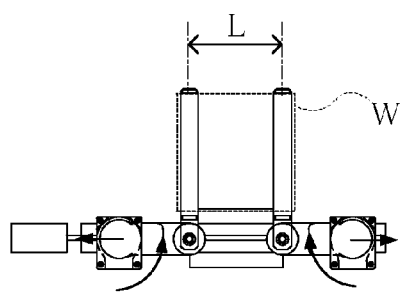
FIG. 6B is a diagram illustrating the operation of the conveying system.
Figure 6C:
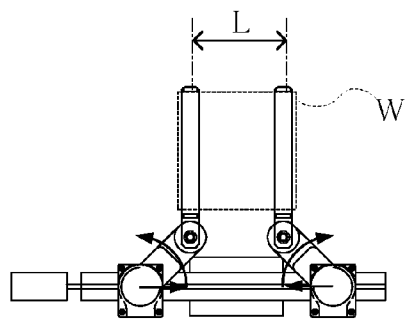
FIG. 6C is a diagram illustrating the operation of the conveying system.
Figure 6D:
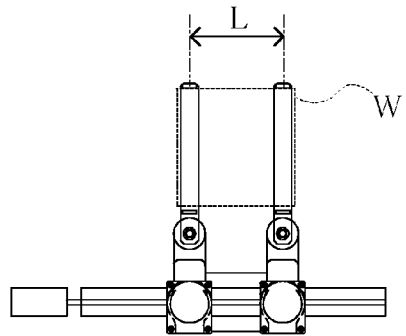
FIG. 6D is a diagram illustrating the operation of the conveying system.

More specifically, as illustrated in FIG. 6B, the rotary actuators 22 (rotary driving bodies 22b) included the arms 1 and 2 are driven so as to swing the arm bodies 23 in directions such that the distal ends of the arm bodies 23 move toward each other (inward directions shown by the arrows in FIG. 6B).

At the same time, the controller 55 drives the linear actuator 3 so as to move the bases 21 of the arms 1 and 2 away from each other. The controller 55 adjusts the operation speeds of the rotary actuators 22 and the linear actuator 3 so that the forks 24 move along linear paths that extend in the forward-backward direction. The arms 1 and 2 move symmetrically to each other about a center plane of the linear actuator 3.

Similar to the case of outward rotation, in the case of inward rotation, the rotary actuators 22 and the linear actuator 3 are driven in association with each other so that the forks 24 linearly move in the forward-backward direction.

As described above, in the object conveying system 100 according to the present embodiment, the rotary actuators 22 of the arms 1 and 2 and the linear actuator 3 are operated in association with each other. Therefore, even though there is only one joint (which corresponds to the unit including the pulley 32 and the thrust bearing 39 in this example) in a section between each rotary actuator 22 and the corresponding fork 24, the fork 24 can be linearly moved in the forward-backward direction.

More specifically, if the forks are moved in the forward-backward direction using only the rotary actuators, two or more joints must be provided between each rotary actuator and the corresponding fork. However, according to the present embodiment, the number of joints can be reduced.

Therefore, the weights of the arms 1 and 2 driven by the rotary actuators can be reduced. As a result, small actuators with relatively low power outputs can be used as the rotary actuators 22.

Since the size of the rotary actuators 22 can be reduced, the load applied to the linear actuator 3 can be reduced. Therefore, a linear actuator with a relatively low power output can be used as the linear actuator 3. As a result, the overall size of the robot can be reduced.

In addition, in the process of conveying the workpiece W with the arms 1 and 2, the distance L between the arms 1 and 2 is adjusted in accordance with the shape information of the workpiece W. Therefore, even when the storage boxes 53a have different dimensions in the left-right direction, each workpiece W can be supported at optimum positions.

Figure 7:
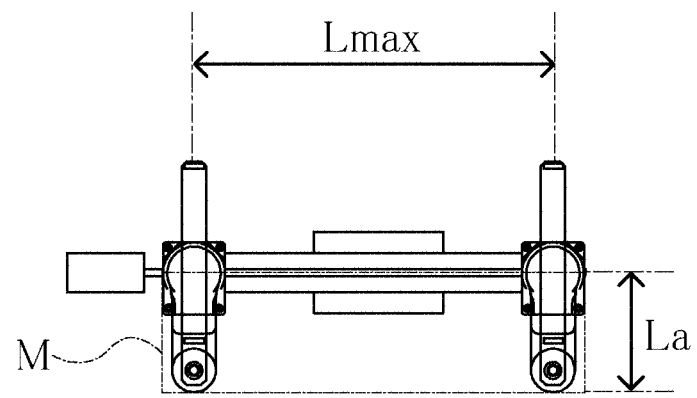
FIG. 7 is a schematic top view illustrating the structure of the robot.

The linear actuator 3 and the rotary actuators 22 are operated in association with each other to linearly move the forks 24 in the forward-backward direction. Therefore, as illustrated in FIG. 7, when a movable range M is a range in which the arm bodies 23 can be moved in an area on the rear side the bases 21 to move the forks 24 in the forward-backward direction, the movable range M is roughly limited in the left-right direction within the maximum value Lmax of the distance L that can be set. The maximum value Lmax is determined by the stroke of the linear actuator 3. In addition, a movable range of each arm body 23 in an area on the rear side the bases 21 is also limited within a rectangular area having the length La of the arm body 23. Therefore, the size of the robot 50 can be further reduced.

In addition, since the distance between the forks 24 is suitably set in accordance with the shape of the workpiece W to be conveyed, the workpieces W having different shapes can be supported at optimum positions (with an optimum gap between the forks 24). Therefore, the workpieces W can be prevented from falling and be conveyed with high reliability.

Second Embodiment

A second embodiment of the present invention will now be described with reference to the drawings.

Components of the present embodiment similar to those in the first embodiment are denoted by the same reference numerals, and detailed explanations thereof are thus omitted.

Figure 8:
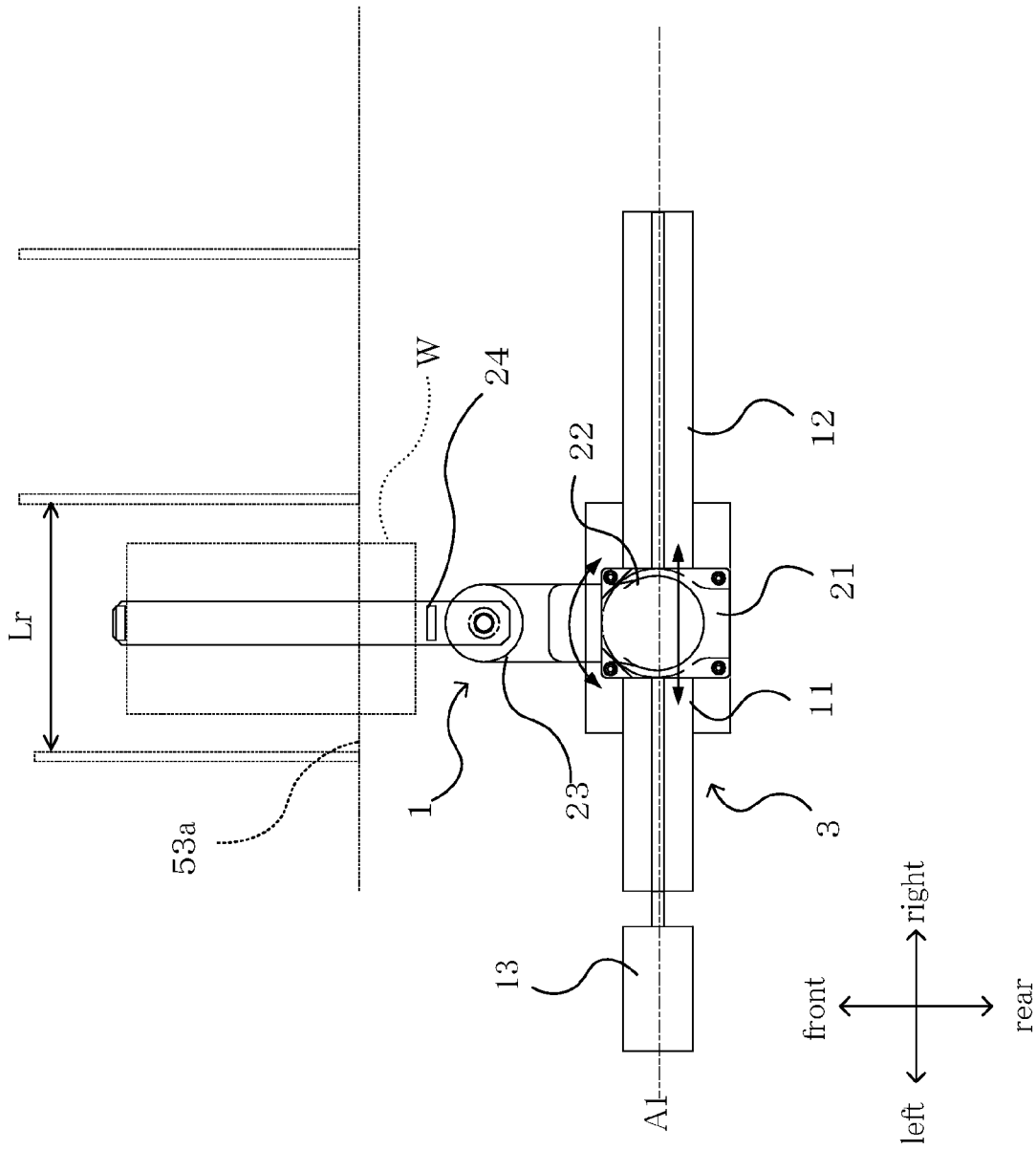
FIG. 8 is a schematic top view illustrating the structure of a robot according to a second embodiment.

As illustrated in FIG. 8, the present embodiment differs from the first embodiment in that only the arm 1 is attached to the linear actuator 3 and the arm 2 is not provided.

In addition, only the slider 14a is attached to the linear actuator 3, and helical grooves are formed in the ball screw 12 in one direction over the entire length thereof. The arm 1 (slider 14a) can be linearly moved over the entire length of the ball screw 12 by the motor 13.

In the present embodiment, the movable range of the linear actuator 3 is larger than the length Lr of each storage box 53a in the left-right direction. Therefore, the fork 24 can be inserted into the storage boxes 53a that are adjacent to each other in the left-right direction by driving the linear actuator 3 without driving the raising-and-lowering device 51 or the horizontal moving device 52.

The object conveying system according to the second embodiment of the present invention is structured as described above. Therefore, similar to the first embodiment, even when there is only one joint, the fork 24 can be linearly moved in the forward-backward direction. As a result, the size of the robot 50 can be reduced without reducing the functionality thereof.

In addition, since the movable range of the linear actuator 3 is larger than the length Lr of each storage box 53a in the left-right direction, the workpieces W in the storage boxes 53a that are adjacent to each other can be conveyed without operating the horizontal moving device 52.

Although the embodiments of the present embodiment are described above, the robot and the object conveying system according to the present invention are not limited to those described in the embodiments and various modifications are possible within the scope of the present invention.

For example, the linear actuator is not limited to those including a ball screw, and any type of linear actuators may be used as long as the arms can be linearly moved along open sides of the storage boxes.

What is claimed as new and is desired to be secured by Letters Patent of the United States is:

1. A robot comprising:
   an arm member;
   a rotary actuator that swings the arm member;
   a hand member provided at an end of the arm member;
   a joint member that connects the arm member and the hand member to each other such that the arm member and the hand member are rotatable with respect to each other;
   a linear actuator that supports and linearly moves the rotary actuator; and
   a controller that operates the rotary actuator and the linear actuator simultaneously in association with each other to linearly move the hand member in a forward-backward direction,
   wherein the linear actuator includes a linear driving shaft and is arranged such that the linear driving shaft extends perpendicular to the forward-backward direction in which the hand member is moved.

2. The robot according to claim 1,
   wherein a base is fixed to the linear actuator so as to support the actuator,
   wherein a first pulley is provided at a proximal end section of the arm member, the first pulley being fixed to the base irrespective of a rotating operation of the actuator,
   wherein a second pulley is provided at a distal end section of the arm member as the joint member, the second pulley being rotatable with respect to the arm member and rotating together with the hand member, and
   wherein a belt member is stretched between the first pulley and the second pulley.

3. The robot according to claim 1,
   wherein the linear actuator includes
     a servo motor, and
     a ball screw driven by the servo motor and having helical grooves formed in the ball screw such that the direction of the helical grooves is reversed at an intermediate position of the ball screw.

4. The robot according to claim 1,
   wherein the joint member is configured to rotatably connect the arm member and the hand member about a first axis, the first axis extending through the end of the arm member in a direction perpendicular to the forward-backward direction;
   wherein the rotary actuator is configured to swing the arm member about a second axis that extends in a direction parallel to the first axis, the second axis extending through an opposite end of the arm member from the end of the arm member that is connected to the hand member; and
   wherein the linear actuator is configured to move in a direction different from the forward-backward direction.

5. The robot according to claim 1,
   wherein the controller is configured to operates the rotary actuator and the linear actuator simultaneously in association with each other such that the hand member maintains a constant longitudinal orientation in the forward-backward direction and maintains a linear motion along the forward-backward direction during a conveying operation.

6. The robot according to claim 1, wherein the linear driving shaft extends perpendicular to an axis of the rotary actuator about which the rotary actuator swings the arm member.

7. The robot according to claim 1, further comprising:
   a support member that is configured to support the arm member; and
   a raising-and-lowering device that is configured to raise and lower the support member in a vertical direction.

8. The robot according to claim 1,
   wherein the linear actuator is configured to linearly move the rotary actuator in a direction perpendicular to the forward-backward direction along the linear driving shaft.

9. The robot according to claim 8, wherein the linear driving shaft extends perpendicular to an axis of the rotary actuator about which the rotary actuator swings the arm member.

10. The robot according to claim 1,
    wherein the robot includes a pair of arms, each arm including the arm member, the rotary actuator, and the hand member.

11. The robot according to claim 10,
    wherein the arms are operated symmetrically to each other about a plane.

12. The robot according to claim 10, further comprising:
    an object-information acquisition unit that acquires shape information of an object to be conveyed,
    wherein the controller adjusts a distance between the arms on the basis of the shape information acquired by the object-information acquisition unit.

13. The robot according to claim 12,
    wherein the controller operates the arms symmetrically to each other about a plane on the basis of the shape information acquired by the object-information acquisition unit.

14. A conveying system comprising:
    a plurality of object storage boxes that store an object;
    a delivery opening through which the object is taken out; and
    a robot that conveys the object stored in one of the object storage boxes to the delivery opening,
    wherein the robot includes
      an arm member,
      a rotary actuator that swings the arm member,
      a hand member provided at an end of the arm member,
      a joint member that connects the arm member and the hand member to each other such that the arm member and the hand member are rotatable with respect to each other,
      a linear actuator that supports and linearly moves the rotary actuator, and
      a controller that operates the rotary actuator and the linear actuator simultaneously in association with each other to linearly move the hand member in a forward-backward direction,
    wherein the linear actuator includes a linear driving shaft and is arranged such that the linear driving shaft extends perpendicular to the forward-backward direction in which the hand member is moved.

15. The conveying system according to claim 14,
    wherein the robot includes a pair of arms, each arm including the arm member, the rotary actuator, and the hand member.

16. The conveying system according to claim 14,
    wherein a base is fixed to the linear actuator so as to support the actuator, wherein a first pulley is provided at a proximal end section of the arm member, the first pulley being fixed to the base irrespective of a rotating operation of the actuator, wherein a second pulley is provided at a distal end section of the arm member as the joint member, the second pulley being rotatable with respect to the arm member and rotating together with the hand member, and wherein a belt member is stretched between the first pulley and the second pulley.

17. The conveying system according to claim 15,
wherein the arms are operated symmetrically to each other about a plane.

18. The conveying system according to claim 14,
wherein the linear actuator includes
a servo motor, and
a ball screw driven by the servo motor and having helical grooves formed in the ball screw such that the direction of the helical grooves is reversed at an intermediate position of the ball screw.

19. The conveying system according to claim 14,
wherein the joint member is configured to rotatably connect the arm member and the hand member about a first axis, the first axis extending through the end of the arm member in a direction perpendicular to the forward-backward direction;

wherein the rotary actuator is configured to swing the arm member about a second axis that extends in a direction parallel to the first axis, the second axis extending through an opposite end of the arm member from the end of the arm member that is connected to the hand member; and wherein the linear actuator is configured to move in a direction different from the forward-backward direction.

20. The conveying system according to claim 14,
wherein the controller is configured to operates the rotary actuator and the linear actuator simultaneously in association with each other such that the hand member maintains a constant longitudinal orientation in the forward-backward direction and maintains a linear motion along the forward-backward direction during a conveying operation.

21. The conveying system according to claim 14, wherein the linear driving shaft extends perpendicular to an axis of the rotary actuator about which the rotary actuator swings the arm member.

22. The conveying system according to claim 14, further comprising:
a support member that is configured to support the arm member; and
a raising-and-lowering device that is configured to raise and lower the support member in a vertical direction.

23. The conveying system according to claim 14,
wherein the linear actuator is configured to linearly move the rotary actuator in a direction perpendicular to the forward-backward direction along the linear driving shaft.

24. The conveying system according to claim 23, wherein the linear driving shaft extends perpendicular to an axis of the rotary actuator about which the rotary actuator swings the arm member.

25. The conveying system according to claim 15, further comprising:
an object-information acquisition unit that acquires shape information of the object to be conveyed,
wherein the controller adjusts a distance between the arms on the basis of the shape information acquired by the object-information acquisition unit.

26. The conveying system according to claim 25,
wherein the controller operates the arms symmetrically to each other about a plane on the basis of the shape information acquired by the object-information acquisition unit.

* * * * *